US007688325B1

(12) United States Patent
Sreenivas et al.

(10) Patent No.: US 7,688,325 B1
(45) Date of Patent: Mar. 30, 2010

(54) SCREEN COMPRESSION FOR MOBILE APPLICATIONS

(75) Inventors: Krishnan Sreenivas, Santa Clara, CA (US); Koen Bennebroek, Santa Clara, CA (US); Karthik Bhat, Sunnyvale, CA (US); Stefano A. Pescador, Sunnyvale, CA (US); David G. Reed, Saratoga, CA (US); Brad W. Simeral, San Francisco, CA (US); Edward M. Veeser, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 672 days.

(21) Appl. No.: 11/534,128

(22) Filed: Sep. 21, 2006

(51) Int. Cl.
*G06F 13/00* (2006.01)

(52) U.S. Cl. ....................... 345/538; 345/555; 345/556; 345/534

(58) Field of Classification Search .................. 345/555
See application file for complete search history.

(56) References Cited

U.S. PATENT DOCUMENTS

| | | | | |
|---|---|---|---|---|
| 5,263,136 | A | 11/1993 | DeAguiar et al. | |
| 5,506,967 | A | 4/1996 | Barajas et al. | |
| 5,526,025 | A | 6/1996 | Selwan et al. | |
| 5,734,744 | A | 3/1998 | Wittenstein et al. | |
| 5,961,617 | A * | 10/1999 | Tsang | 710/100 |
| 5,999,189 | A | 12/1999 | Kajiya et al. | |
| 6,075,523 | A * | 6/2000 | Simmers | 345/555 |
| 6,215,497 | B1 | 4/2001 | Leung | |
| 6,366,289 | B1 | 4/2002 | Johns | |
| 6,704,022 | B1 | 3/2004 | Aleksic | |
| 7,039,241 | B1 | 5/2006 | Van Hook | |
| 7,400,359 | B1 | 7/2008 | Adams | |
| 2006/0053233 | A1 | 3/2006 | Lin et al. | |
| 2007/0257926 | A1 | 11/2007 | Deb | |

OTHER PUBLICATIONS

Office Action. U.S. Appl. No. 11/610,411. Dated Feb. 25, 2009.
Office Action. U.S. Appl. No. 11/534,043. Dated Mar. 10, 2009.
Office Action. U.S. Appl. No. 11/534,107. Dated Mar. 17, 2009.

* cited by examiner

*Primary Examiner*—Xiao M Wu
*Assistant Examiner*—Scott E Sonners
(74) *Attorney, Agent, or Firm*—Patterson & Sheridan, LLP

(57) ABSTRACT

One embodiment of the invention sets forth a technique for compressing and storing display data and optionally compressing and storing cursor data in a memory that is local to a graphics processing unit to reduce the power consumed by a mobile computing device when refreshing the screen. Compressing the display data and optionally the cursor data also reduces the relative cost of the invention by reducing the size of the local memory relative to the size that would be necessary if the display data were stored locally in uncompressed form. Thus, the invention may improve mobile computing device battery life, while keeping additional costs low.

18 Claims, 13 Drawing Sheets

SCREEN COMPRESSION FOR MOBILE APPLICATIONS

BACKGROUND OF THE INVENTION

1. Field of the Invention

Embodiments of the present invention relate generally to the field of computing devices and more specifically to a technique for reducing power consumed during frame updates through compression and local storage of display and cursor data.

2. Description of the Related Art

High performance mobile computing devices typically include high performance microprocessors and graphics adapters as well as large main memories. Since each of these components consumes considerable power, the battery life of a high performance mobile computing device is usually quite short. For many users, battery life is an important consideration when deciding which mobile computing device to purchase. Thus, longer battery life is something that sellers of high performance mobile computing devices desire.

As mentioned, the graphics adapters found in most high performance mobile computing devices consume considerable power, even when performing tasks like refreshing the screen for display. For example, a typical graphics adapter may refresh the screen twenty to sixty times per second. For each screen refresh, the graphics adapter usually reads several blocks of display data store in main memory, creates a frame from this display data, and then transmits the frame for display. Transmitting the read requests from the graphics adapter to the main memory consumes power, reading the blocks of display data from main memory consumes power, and creating the frame as well as transmitting the frame for display consumes power. Further, this sequence of events usually involves several intermediate logic blocks, such as a bus controller and a memory controller, each of which also consumes power.

FIG. 1 illustrates a prior art mobile computing device 100 that uses display data stored in main memory to refresh the screen. As shown, the computing device 100 includes a graphics processing unit ("GPU") 102, a Hyper Transport™ ("HT") bus 108, a microprocessor 104 and a main memory 106. The GPU 102 is coupled to the HT bus 108 through a bus interface 130, the microprocessor 104 is coupled to the HT bus 108 through a bus interface 132, and the main memory 106 is coupled to the microprocessor 104 through a memory interface 136. Additionally, the GPU 102 includes a Frame Buffer Unified Memory Architecture ("FB UMA") 110, a Fast PCI™ Bus Interface ("FPCI") 112 and display logic 114, where the FB UMA 110 includes arbitration logic 116, unrolling logic 118, tiling logic 120 and control logic 115. Control logic 115 may include firmware or software, and is coupled to arbitration logic 116, unrolling logic 118, tiling logic 120, the FPCI 112 and display logic 114 through interfaces that are not shown in FIG. 1. The FPCI 112 is coupled to tiling logic 120 and display logic 114 through interfaces 126 and 128, respectively. Unrolling logic 118 is coupled to tiling logic 120 and arbitration logic 116 through interfaces 124 and 122, respectively. Display logic 114 is coupled to arbitration logic 116 through interface 127. The microprocessor 104 includes a memory controller 134. Finally, a software driver 140 as well as display and cursor data 138 are stored in the main memory 106.

Refreshing the screen begins with display logic 114 requesting arbitration logic 116 to read some or all screen addresses, defined by line and pixel coordinates, from the display data 138 in the main memory 106. This request causes arbitration logic 116 to schedule a read operation. Arbitration logic 116 prioritizes all outstanding read and write requests within the FB UMA 110 and transmits requests to unrolling logic 118 in order of priority. For example, since display logic 114 uses the current display data 138 to refresh the screen within a fixed time period (e.g., one-twentieth to one-sixtieth of a second), read operations contributing to screen refresh are assigned a high priority by arbitration logic 116 based on that fixed time constraint. Alternatively, other read or write operations that are not under timing constraints are assigned a lower priority by arbitration logic 116.

Once arbitration logic 116 prioritizes and transmits the high priority read operation through the interface 122 to unrolling logic 118, control logic 115 directs unrolling logic 118 to unroll the read operation into a series of smaller (e.g., 64B) read operations that are small enough for the HT bus 108 to perform in a single bus transaction. In a subsequent step of the overall read operation, the result of these smaller read operations are combined into the single, contiguous and ordered data block originally requested by display logic 114. For example, if display logic 114 requests control logic 115 to perform a high priority read operation of pixels from the cursor and display data 138, and arbitration logic 116 transmits that operation to unrolling logic 118, unrolling logic 118 will unroll the pixel read operation into a series of smaller read operations.

After unrolling logic 118 unrolls the read operation into smaller read operations, control logic 115 directs unrolling logic 118 to transmit those smaller read operations through the interface 124 to tiling logic 120. Control logic 115 then directs tiling logic 120 to determine the physical memory address for each smaller read operation based on the screen address associated with the smaller read operation initially requested by display logic 114. Control logic 115 also directs tiling logic 120 to transmit each smaller read operation with its corresponding physical address through the interface 126 to the FPCI 112.

For each smaller read operation received by the FPCI 112, the FPCI 112 transmits a read request to the memory controller 134 within the microprocessor 104 through the interface 130, the HT bus 108 and the interface 132. However, if the HT bus 108 is in power savings mode before the FPCI 112 transmits the read request to the memory controller 134, the FPCI 112 brings the HT bus 108 out of power savings mode before transmitting the request. Once one or more read requests are transmitted to the memory controller 134, the memory controller 134 reads the requested data from the main memory 106 through memory interface 136 and transmits the data to the FPCI 112. As is well-known, the memory controller 134 frequently transmits the data back to the FPCI 112 out-of-order relative to the order of read requests transmitted by the FPCI 112 to the memory controller 134. Since display logic 114 expects contiguous and ordered display data to create the frame properly, the FPCI 112 reorders and combines the smaller blocks of data received from the memory controller 134 into a single, contiguous and ordered data block that is transmitted through the interface 128 to display logic 114, which then creates the frame accordingly.

As previously described, one drawback of the foregoing process is that read operations between the GPU 102 and the main memory 106 may consume substantial power, which can reduce the battery life for mobile computing devices. More specifically, each read operation consumes power due to transmitting a read request from the FPCI 112 to the memory controller 134 through the HT bus 108 and transmitting a read response from the memory controller 134 to the FPCI 112 through the HT bus 108. Additionally, if either the HT bus 108 or memory controller 134 is in power saving mode before transmitting a request or response, bringing the HT bus 108 or the memory controller 134 out of power saving mode consumes additional power. Further, as is commonly known, reading display data from the system memory 106 consumes substantial power both in the main memory 106 and in the memory controller 134. Thus, over the course of many screen refreshes, substantial battery power is consumed.

As the foregoing illustrates, what is needed in the art is a way to reduce the amount of battery power consumed by a mobile computing device when refreshing the screen.

SUMMARY OF THE INVENTION

One embodiment of the present invention sets forth a method for configuring a graphics processing unit to refresh a screen display using data stored in a local memory and/or a main memory. The method includes the steps of setting a threshold limit in a threshold counter for determining whether cursor data and display data may be preferentially stored in the local memory but also may be stored in the main memory, configuring control logic within the graphics processing unit to read cursor data and display data from only the main memory, reading cursor data and display data related to a first frame from the main memory, and creating the first frame using the cursor data and the display data read from the main memory. The method also includes the steps of determining whether the first frame is different than a previously created frame, and adjusting a count of the threshold counter based on whether the first frame is different than the previously created frame.

Another embodiment of the present invention sets forth a method for reading display data from the local memory coupled to the graphics processing unit or from the main memory. The method includes the steps of receiving a request to execute a read operation on display data related to a first frame, partitioning the read operation into a plurality of smaller read operations, selecting a first smaller read operation to execute, partitioning the first smaller read operation into a plurality of block read operations, and selecting a first block read operation to execute. The method also includes the steps of translating a display address associated with the first block read operation into a physical address associated with a first display data buffer, determining whether a state bit corresponding to the first display data buffer is set, and reading display data related to the first block read operation from either the local memory or the main memory based on whether the state bit is set.

Yet another embodiment of the present invention sets forth a method for reading cursor data from the local memory coupled to the graphics processing unit or from the main memory. The method includes the steps of receiving a request to execute a read operation on cursor data related to a first frame, partitioning the read operation into a plurality of smaller read operations, selecting a first smaller read operation to execute, determining whether a state bit corresponding to a cursor data buffer is set, and reading cursor data related to the first smaller read operation either from the local memory or from the main memory based on whether the state bit is set.

One advantage of the present invention is that it enables display data to be compressed and stored and cursor data to be optionally compressed and stored in a memory that is local to a graphics processing unit to reduce the power consumed by a mobile computing device when performing a screen refresh operation. Compressing the display data and optionally the cursor data also reduces the relative cost of the invention by reducing the size of the local memory relative to the size that would be necessary if the data were stored locally in uncompressed form. Thus, the invention may improve mobile computing device battery life, while keeping additional costs low

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Typical mobile computing device users spend much of their time running office applications, such as word processing or spreadsheet programs. These tasks are characterized by long periods of user and display inactivity that are occasionally interrupted by keyboard or mouse input, which cause the mobile computing device to update the display accordingly. During periods of GPU inactivity, the graphics adapter rereads the same display data from main memory many times, creating identical successive frames for display. As previously described herein, each display data read operation may involve waking up the HT bus and the memory controller, reading the corresponding data from main memory, and performing one or more HT bus transactions, consuming an undesirable amount of battery power.

Efficiencies may be realized by storing a copy of current cursor data and display data in a memory that is local to the graphics adapter, thereby eliminating the need to fetch display data from main memory between mouse inputs, keyboard inputs or display updates when the data does not change from frame to frame. Further efficiencies may be realized by partitioning the display into one or more blocks per display line and partitioning the local memory into a corresponding number of buffers whose data is updated only when the relevant blocks of display data change in main memory. Still-further efficiencies may be realized by compressing the display data stored in local memory to allow a smaller local memory to be used, thereby reducing the cost of implementing the local memory. However, cursor data is usually stored in uncompressed form since the relatively small amount of data required to store the cursor (e.g., 16 KB) does not justify the complexity of compressing this data. Overall, these features may substantially reduce the power consumed in the mobile computing device relative to prior art solutions, while maintaining high graphics performance and minimizing the cost of storing cursor and display data locally.

Figure 2A:
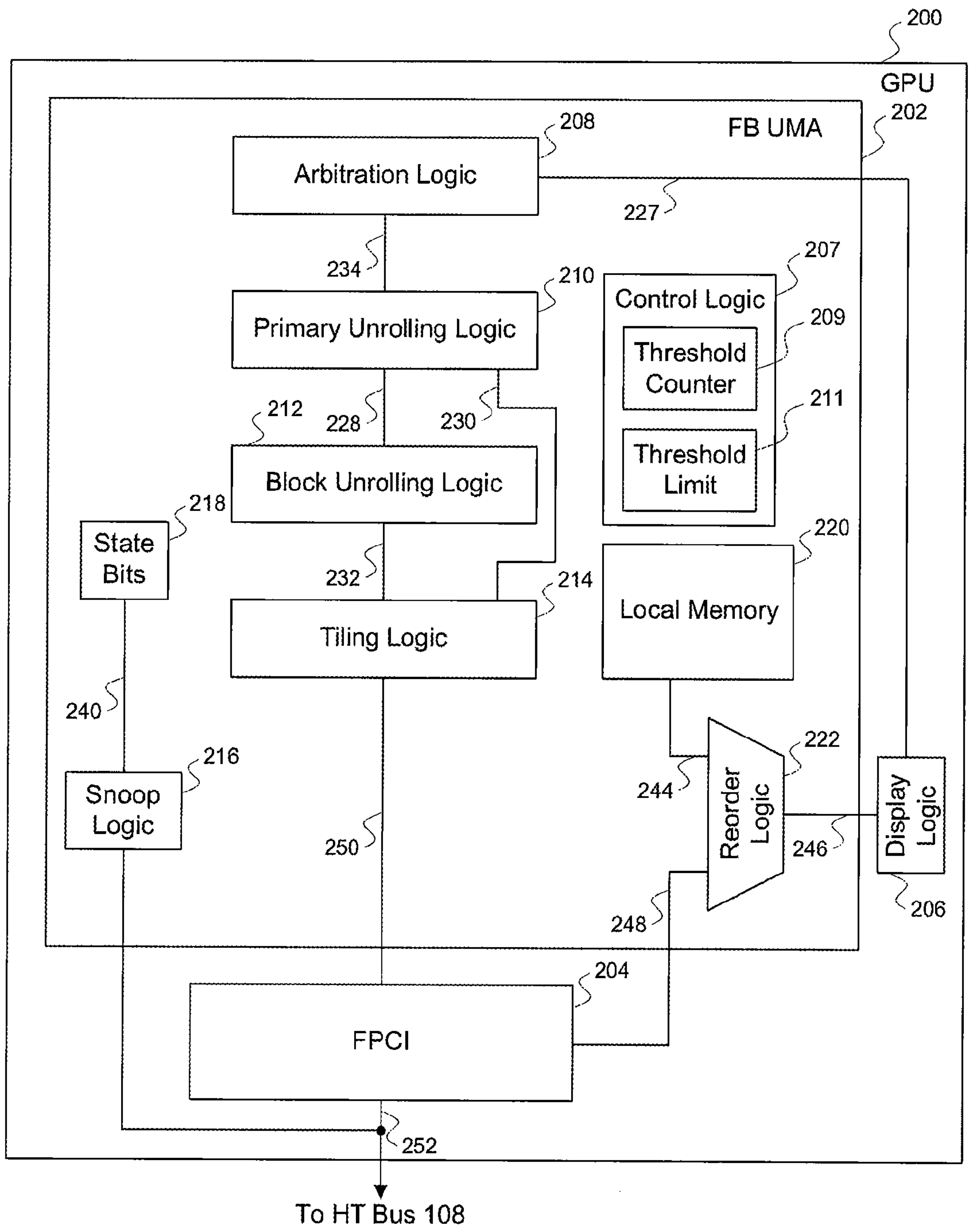
FIG. 2A illustrates a graphics processing unit configured to use display and cursor data stored in local memory and/or main memory to refresh the screen, according to one embodiment of the invention.

FIG. 2A illustrates a GPU 200 configured to use display and cursor data stored in a local memory 220 and/or a main memory (not shown), according to one embodiment of the invention. As shown, the GPU 200 includes an FB UMA 202, an FPCI 204 and display logic 206. The FB UMA 202 includes arbitration logic 208, primary unrolling logic 210, block unrolling logic 212, tiling logic 214, a state bit memory 218, snoop logic 216, reorder logic 222, control logic 207 and the local memory 220. Control logic 207 includes a threshold counter 209, a threshold limit register 211, and may be implemented in firmware or software. Control logic 207 is coupled to arbitration logic 208, primary unrolling logic 210, block unrolling logic 212, tiling logic 214, the FPCI 204, the state bit memory 218, reorder logic 222, the local memory 220 and display logic 206 through interfaces that are not shown in FIG. 2 for the sake of simplicity. The FPCI 204 is coupled to tiling logic 214 and reorder logic 214 through interfaces 250 and 248, respectively. The FPCI 204 and snoop logic 216 are coupled to the HT bus 108 (not shown) through an interface 252. Tiling logic 214 is coupled to block unrolling logic 212 and primary unrolling logic 230 through interfaces 232 and 230, respectively. Primary unrolling logic 210 is coupled to arbitration logic 208 and block unrolling logic 212 through the interfaces 234 and 228, respectively. Reorder logic 222 is coupled to display logic 206 and the local memory 220 through interfaces 246 and 244, respectively. Display logic 206 is coupled to arbitration logic 208 through interface 227. Finally, the state bit memory 218 is coupled to snoop logic 216 through interface 240.

In one embodiment of the invention, the local memory 220 may be an embedded dynamic random access memory ("eDRAM"). In other embodiments of the invention, the local memory 220 may be any technically feasible type of memory, including any type of RAM located either internally or externally to the GPU 200, without departing from the scope of the invention.

The GPU 200 may compress display data and store cursor and display data in the local memory 220 to reduce power during screen refresh by first configuring itself to use the local memory for cursor data and display data storage when the data stored in main memory has not changed, as described below in FIG. 3, and then selectively reading the cursor data and display data from the local memory 220 when creating a new frame, as described below in FIGS. 4-6B. The GPU 200 is advantageously configured to update the cursor data and display data stored in the local memory 220 as that data is read from main memory and then transmitted from the FPCI 204 to display logic 206, as also described below in FIGS. 5A-6B. More specifically, when the necessary display data is not present or is invalid in the local memory 220, reading display data from main memory and, then, compressing and storing the display data in the local memory 220 allows that display data to be preferentially read from the local memory 220 when creating subsequent frames. Similarly, when cursor data is not present or is invalid in the local memory 220, reading cursor data from main memory then storing the cursor data in the local memory 220 allows that cursor data also to be preferentially read from the local memory 220 when creating subsequent frames.

As described in greater detail herein, cursor data and display data are read from main memory until the value in the compression counter 209, which counts the number of consecutive unchanged frames, equals the value in the threshold limit register 211, which is set by a software driver, such as software driver 140, and represents the number of consecutive unchanged frames to wait before storing cursor data and compressed display data in the local memory 220. Importantly, when the cursor and display data are being read from the local memory 220, any changes to the main memory versions of the data cause snoop logic 216 to invalidate the corresponding versions of the data in the local memory 220. If snoop logic 216, which monitors the HT bus 108 for any write operations to cursor data or display data addresses in main memory, detects that either the cursor data or display data in main memory has changed, then snoop logic 216 invalidates the buffer in the local memory 220 corresponding to the changed data by resetting the state bit for that local memory buffer in the state bit memory 218 through the interface 240. As a result of the reset state bit, during creation of the next frame, control logic 207 reads the updated data in main memory rather than the invalid data in the local memory 220. Thus, the GPU 202 always uses the most current cursor data and display data for screen refresh.

Figure 1:
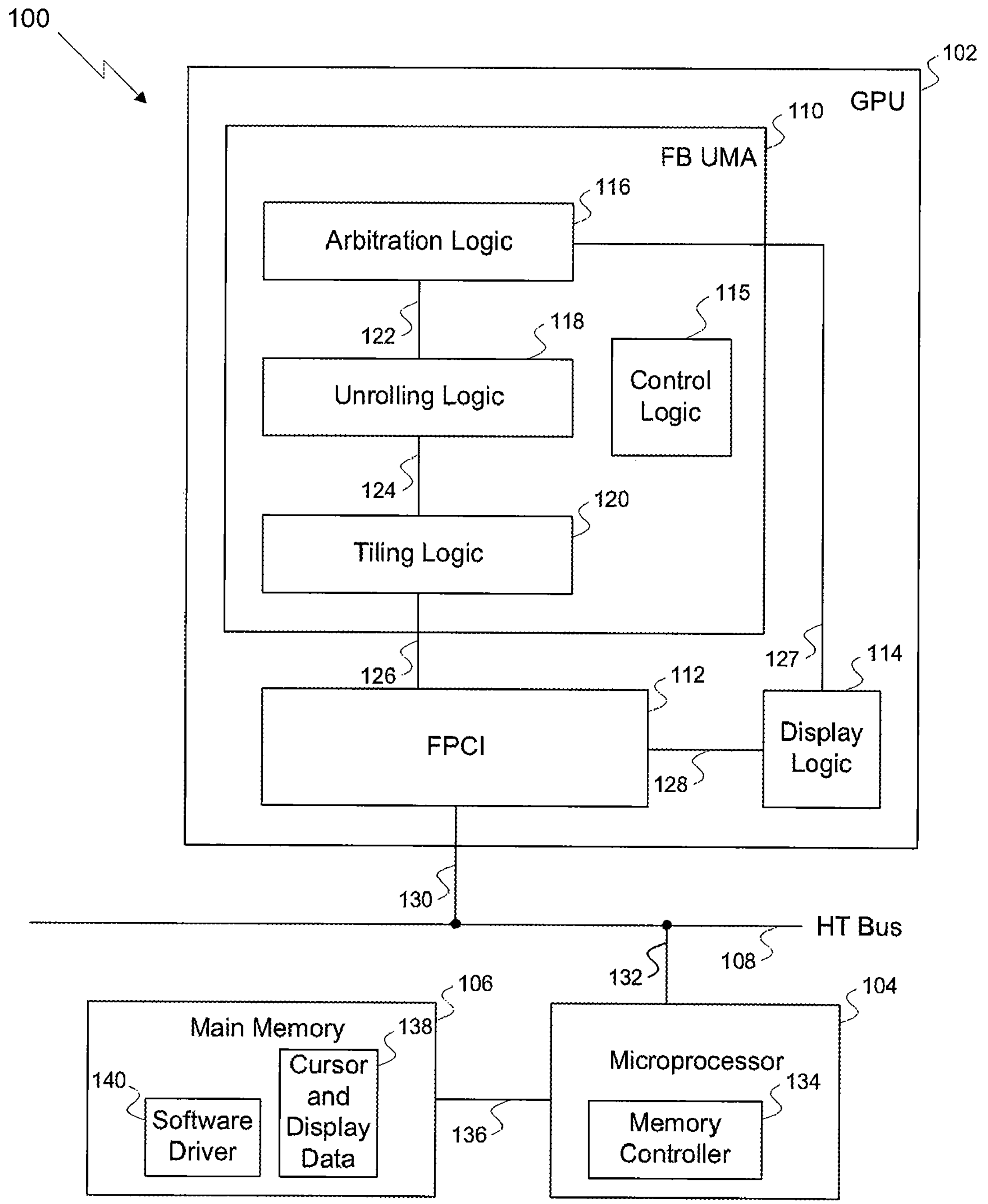
Figure 1 (Prior Art)
FIG. 1 illustrates a prior art mobile computing device that uses display and cursor data stored in main memory to refresh the screen.
Figure 2B:
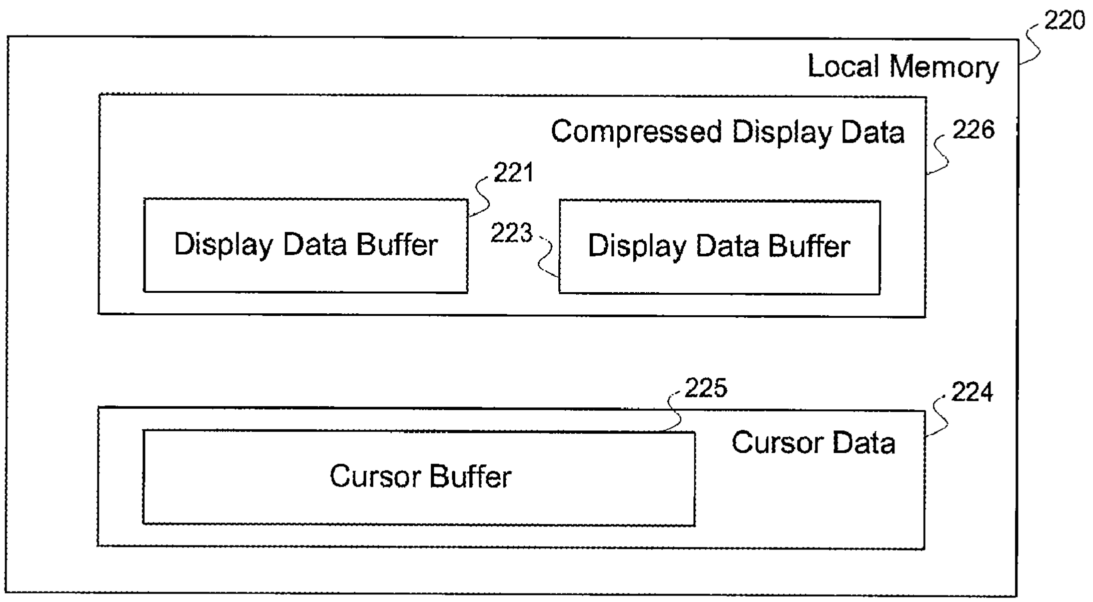
FIG. 2B is a more detailed illustration of the local memory of FIG. 2A, according to one embodiment of the invention.

FIG. 2B is a more detailed illustration of the local memory 220 of FIG. 1B, according to one embodiment of the invention. As shown, the local memory 220 includes cursor data 224 and compressed display data 226. Compressed display data 226 includes a plurality of display data buffers 221, 223, each of which is configured to store one block of display data, as described in greater detail herein. Likewise, cursor data 224 includes a cursor buffer 225 in which cursor data is stored.

Figure 3A:
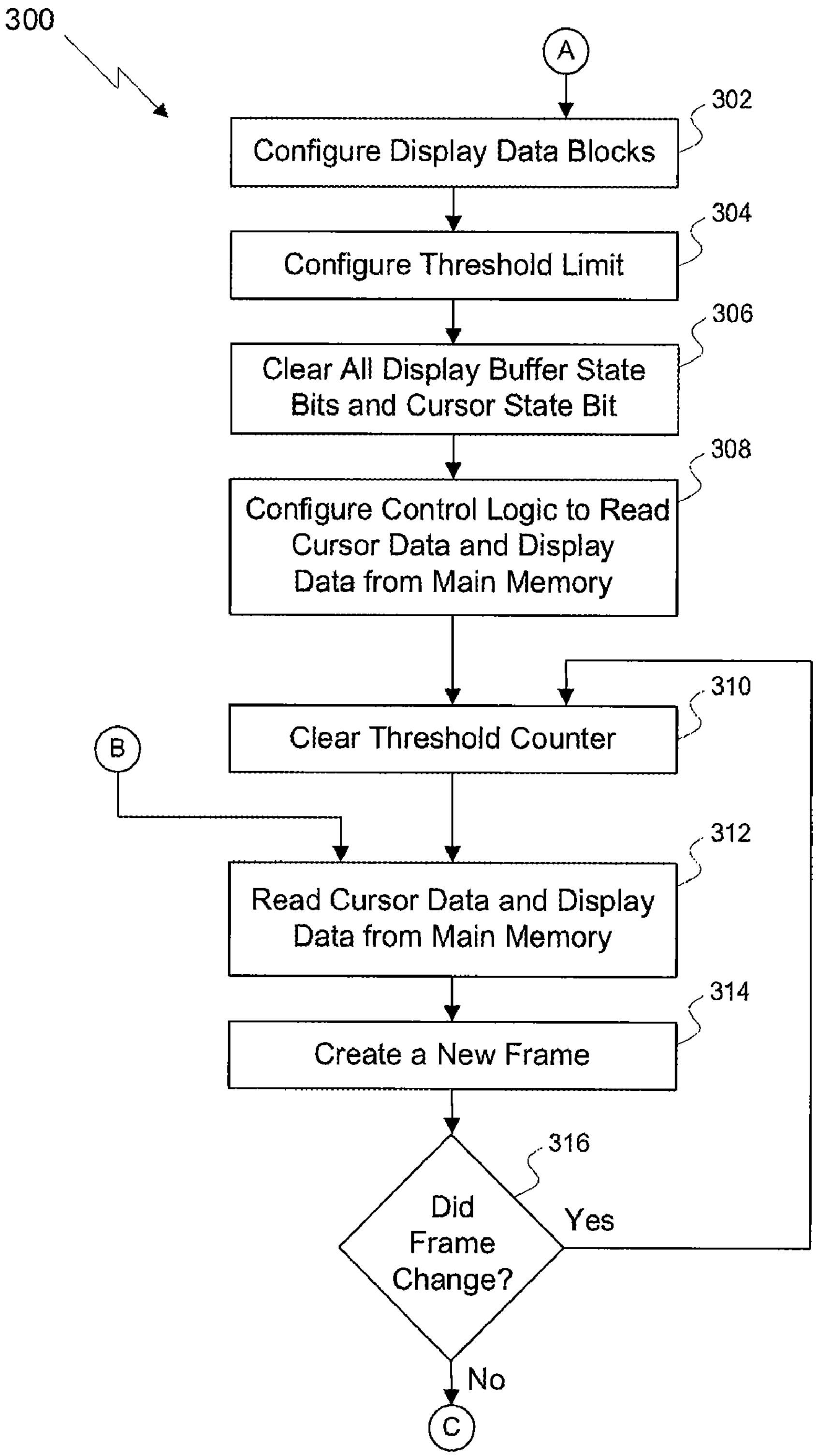
FIG. 3 illustrates a flowchart of method steps for configuring the graphics processing unit of FIG. 2A to create frames using cursor data and display data stored in local memory and/or main memory, according to one embodiment of the invention.
Figure 3B:
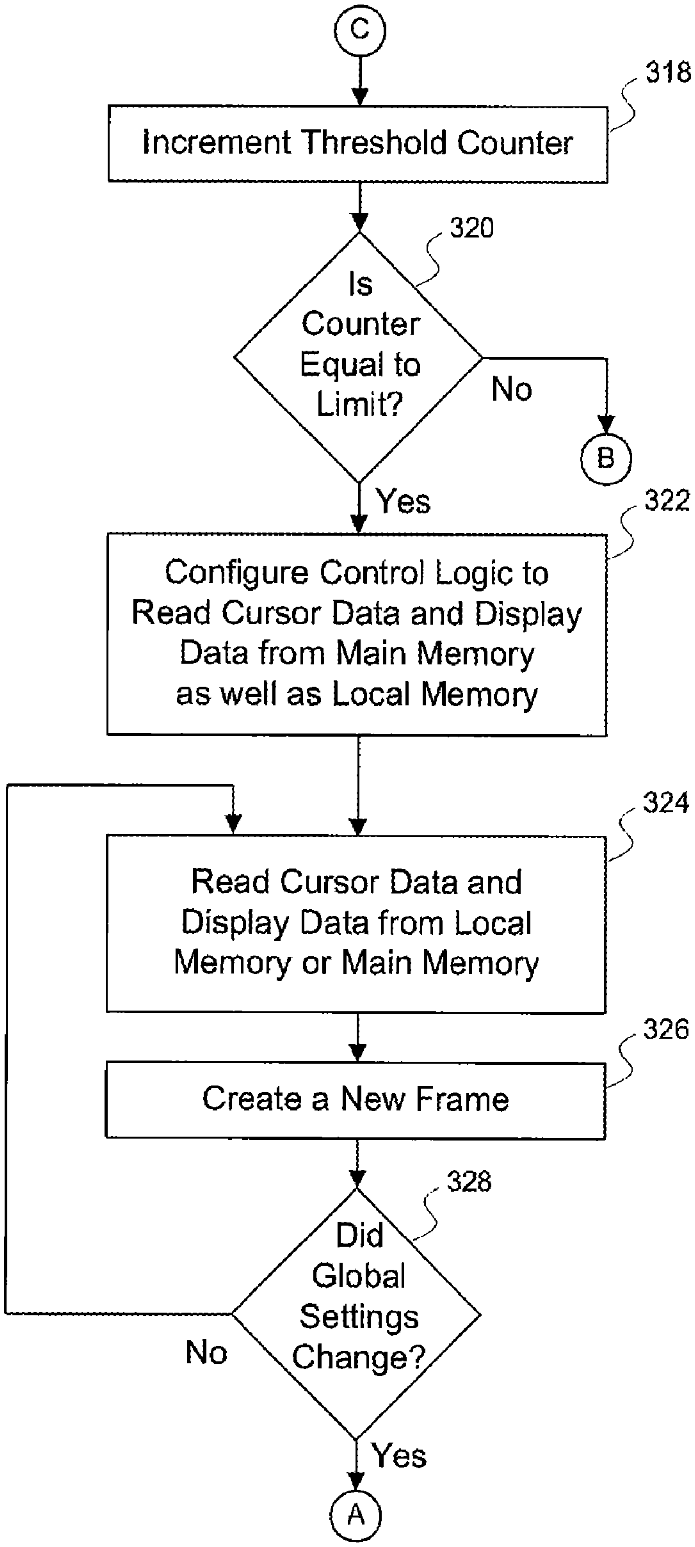

FIG. 3 illustrates a flowchart of method steps 300 for configuring a graphics processing unit to create frames using cursor data and display data stored in local memory and/or main memory, according to one embodiment of the invention. Although the method is described in reference to the GPU 200 set forth in FIG. 2, persons skilled in the art will understand that any system configured to perform the method steps, in any order, is within the scope of the present invention.

As shown, the method 300 for configuring the GPU 200 begins at a step 302, where the size of the display data blocks is configured by a software driver program. In one embodiment of the invention, referred to as "block compression," the display may be partitioned into blocks of three alternative sizes: one block per frame line, one block per half frame line, or one block per quarter frame line (see, e.g., FIG. 7). However, those skilled in the art will recognize that the display may be partitioned into any technically feasible number of blocks without departing from the scope of the invention. Splitting lines into blocks of uncompressed data in this fashion may cause the last block per line to include fewer pixels than the other blocks in that line, if the system is configured to include more than one block per line. Also, the possibility exists that the memory required to store a block of display data may exceed the size of the buffer corresponding to that block, even after compression. In such cases, the display data for these blocks is read from main memory even when the display data in those blocks does not change. Although any technically feasible form of lossless compression may be used for compressing the display data, additional efficiencies may be realized by utilizing the specific form of compression described in the patent application Ser. No. 11/610,411 titled, “Compression of Display Data Stored Locally on a GPU,” filed on Dec. 13, 2006. This patent application is incorporated herein by reference.

In step 304, the software driver 140 stores a predefined value in the threshold limit register 211. As previously described, the value of the threshold limit register 211 determines how many consecutive unchanged frames occur, as measured by the threshold counter 209, before cursor data and compressed display data is stored in the local memory 220. As long as the value of the threshold counter 209 is less than the value in the threshold limit register 211, any display data changes in main memory cause control logic 207 to clear the threshold counter 209. For example, if the GPU 200 is configured to start compression after ten consecutive unchanged frames, the software driver 140 stores the value ten in the threshold limit register 211, and cursor data and display data is read from main memory until ten consecutive display updates are performed without a display data change. However, if the display data in main memory changes after five consecutive display updates without a display data change, then the threshold counter 209 is reset from five to zero by control logic 207, and control logic 207 continues to read cursor data and display data from main memory. Starting display compression after a predefined number of consecutive unchanged frames reduces power consumption in situations where the display changes frequently since compressing and storing display data locally that may be quickly invalidated is quite inefficient.

In step 306, control logic 207 clears all state bits in the state bit memory 218. As described herein, when a state bit is clear, control logic 207 reads the cursor data buffer or display data buffer corresponding to that state bit from main memory rather than from the local memory 220 during frame creation. Only after one or more state bits are set is data read from the corresponding data buffers in the local memory 220. In step 308, control logic 207 configures itself to read cursor data and display data from main memory. In step 310, control logic 207 clears the threshold counter 209. In step 312, control logic 207 executes an operation to read uncompressed cursor data from the main memory and an operation to read uncompressed display data from the main memory to create a new frame for display. When reading data from only main memory, the GPU 200 operates in a manner that generally follows the description set forth in FIG. 1. Importantly, as described in FIG. 1, the cursor data and display data read operations are partitioned into a plurality of smaller read operations. Again, as is well known, the results of the partitioned read operations may not return from main memory in the order the read operations were requested. Thus, for the results of the partitioned read operations to be transmitted to display logic 206 in-order, control logic 207, in conjunction with the FPCI 204, reorders the results from all partitioned read operations into single, contiguous and ordered read results as part of step 312. In step 314, display logic 206 creates a new frame from the cursor data and display data read in step 312.

In step 316, control logic 207 determines whether the new frame created in step 314 differs from the previous frame created. If the new frame does not differ from the previous frame, then the method proceeds to step 318, where control logic 207 increments the threshold counter 209. In step 320, control logic 207 determines whether the value of the threshold counter 209 equals the value stored in the threshold limit register 211. If the value of the threshold counter 209 equals the value stored in the threshold limit register 211, the method proceeds to step 322, where control logic 207 configures itself to preferentially read from the local memory 220, although control logic 207 may also read from main memory. Importantly, although cursor data is stored either in the local memory 220 or in the main memory, but not both simultaneously, display data may be stored in main memory or the local memory 220 or both. Again, by control logic 207 configuring itself to read cursor data and display data from both the local memory 220 and main memory, control logic 207 enables cursor data and compressed display data to be advantageously stored in local memory.

Figure 4:
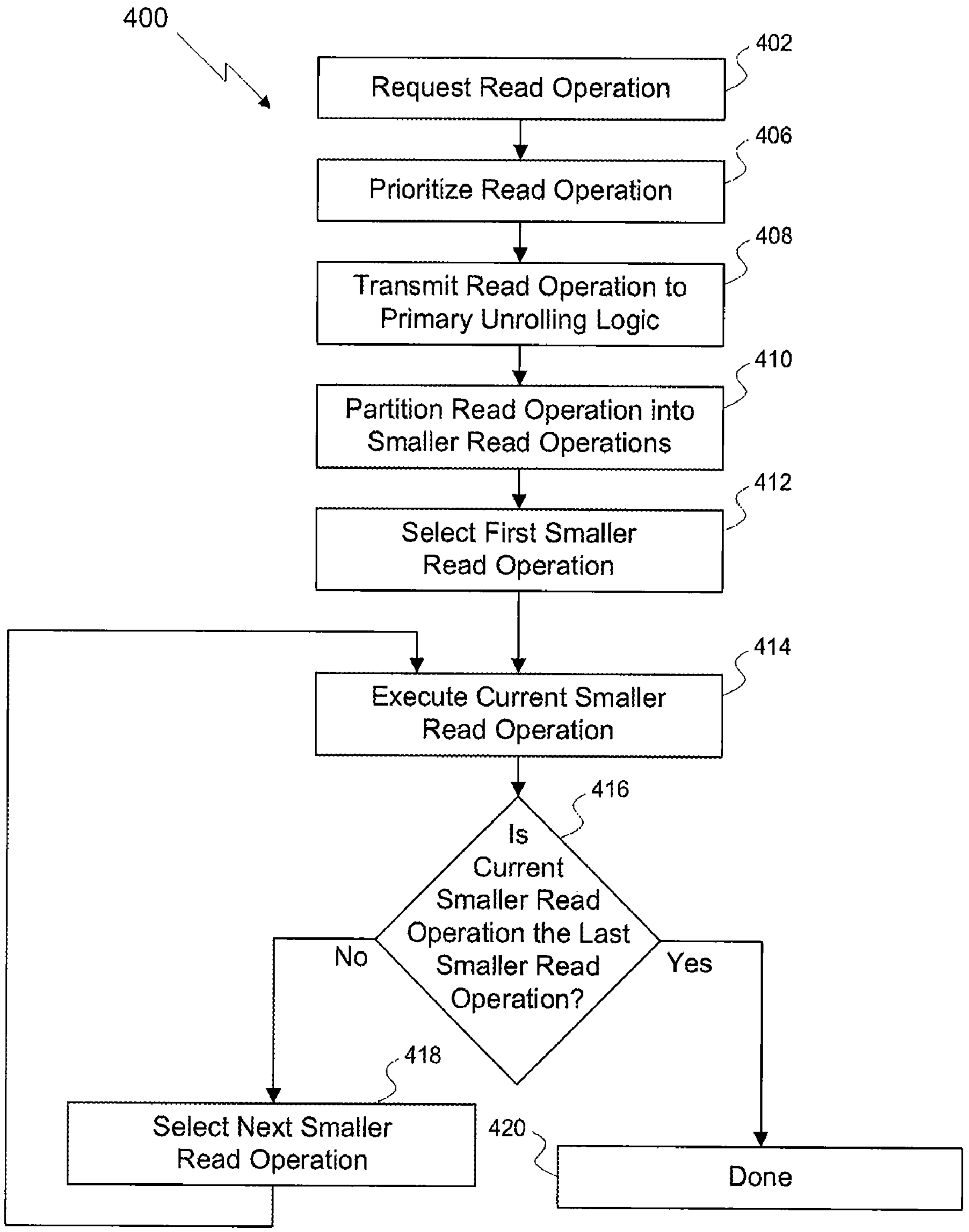
FIG. 4 illustrates a flowchart of method steps for executing a read operation on display data stored in local memory and/or main memory, according to one embodiment of the invention.

In step 324, control logic 207 executes an operation to read the cursor data needed to create a new frame for display as well as an operation to read the display data needed to create the new frame. In contrast to step 312, the cursor data and the display data may be preferentially read from the local memory 220 or read from the main memory, as the case may be, depending on whether the state bits for the relevant data buffers in the local memory 220 are set. FIGS. 4-5C describe in greater detail the portion of step 324 involving the execution of a read operation on display data, and FIGS. 6A-6B describe in greater detail the portion of step 324 involving the execution of a read operation on cursor data. When reading cursor data and display data from both local memory 220 and main memory, read operations are again partitioned into a plurality of smaller read operations. Further, the smaller read operations related to display data may again be partitioned into block read operations. Importantly, either all or none of the cursor data is stored in the local memory 220, in contrast to the display data, which may be partially stored in the local memory 220. As previously discussed, the results of the partitioned read operations may not return from the local memory 220 and the main memory in the order the read operations were requested. Thus, for the results of the partitioned read operations to be transmitted to display logic 206 in-order, control logic 207, in conjunction with reorder logic 222 and the FPCI 204, reorders the results from all partitioned read operations into single, contiguous and ordered read results as part of step 324. In step 326, display logic 206 creates a new frame from the cursor data and display data read in step 324. In step 328, control logic 207 determines whether any global settings, such as the display resolution or the number of blocks per display line, have changed since the last frame was created. If any global settings have changed, the method proceeds to step 302, where the system is reconfigured to account for the global setting change. If, in step 328, no global settings have changed, the method returns to step 324, where control logic 207 reads the cursor data and display data for creating the next frame from the local memory 220 or main memory, as the case may be.

Returning now to step 320, if the value of the threshold counter 209 does not equal the value stored in the threshold limit register 211, then the method returns to step 312, where control logic 207 reads the cursor data and display data for creating the next frame from main memory. Returning now to step 316, if the new frame created in step 314 differs from the previous frame created, the method returns to step 310, where the threshold counter 209 is cleared.

FIG. 4 illustrates a flowchart of method steps for executing a read operation of display data stored in local memory 220 and/or main memory, according to one embodiment of the invention. As previously indicated, this method sets forth the more specific steps for reading display data from local or main memory, as the case may be, reflected in step 324 of FIG. 3. Although the method is described in reference to the GPU 200 of FIG. 2, persons skilled in the art will understand that any system configured to perform the method steps, in any order, is within the scope of the present invention.

As shown, the method for reading display data begins at a step 402, where display logic 206 requests through the interface 227 for arbitration logic 208 to read all screen addresses, defined by line and pixel coordinates, from memory. Again the display data requested may be stored in the local memory 220 and/or the main memory. In step 406, arbitration logic 208 prioritizes the read operation. Read operations related to a display update have a fixed time constraint, so arbitration logic 208 assigns a high priority to these types of read operations, while read or write operations for other purposes may be assigned a lower priority. In step 408, arbitration logic 208 initiates the high priority read operation by transmitting the read operation through the interface 234 to primary unrolling logic 210.

In step 410, primary unrolling logic 210 partitions (or "unrolls") the read operation into a series of smaller (e.g., 32B) read operations that are small enough for the HT bus to perform as single bus transactions. After unrolling the full read operation into smaller read operations in step 412, primary unrolling logic 210 selects a first smaller read operation to process as the current smaller read operation. In step 414, the current smaller read operation is processed, as described in further detail in FIGS. 5A-5C. In step 416, primary unrolling logic 210 determines whether the current smaller read operation is the last smaller read operation in the series of smaller read operations generated in step 410. If the current smaller read operation is not the last smaller read operation, then the method proceeds to step 418, where the primary unrolling logic 210 selects the next smaller read operation in the series of read operations to process. The method then returns to step 414, where that next smaller read operation is processed. If, in step 416, the current smaller read operation is the last smaller read operation, then the method proceeds to step 420 and terminates.

Figure 5A:
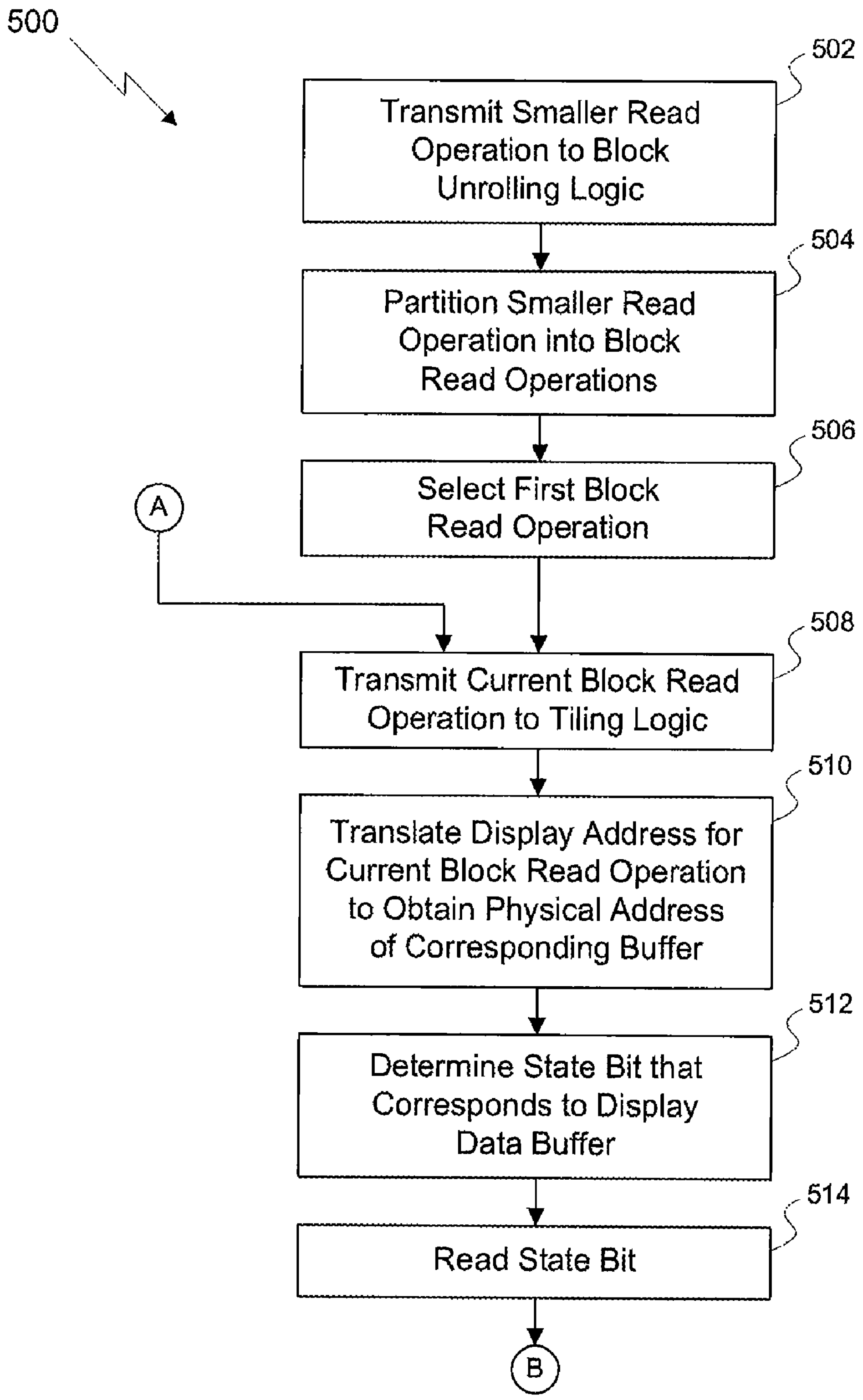
FIGS. 5A, 5B and 5C illustrate a flowchart of method steps for executing a smaller read operation on display data stored in local memory and/or main memory, according to one embodiment of the invention.
Figure 5B:
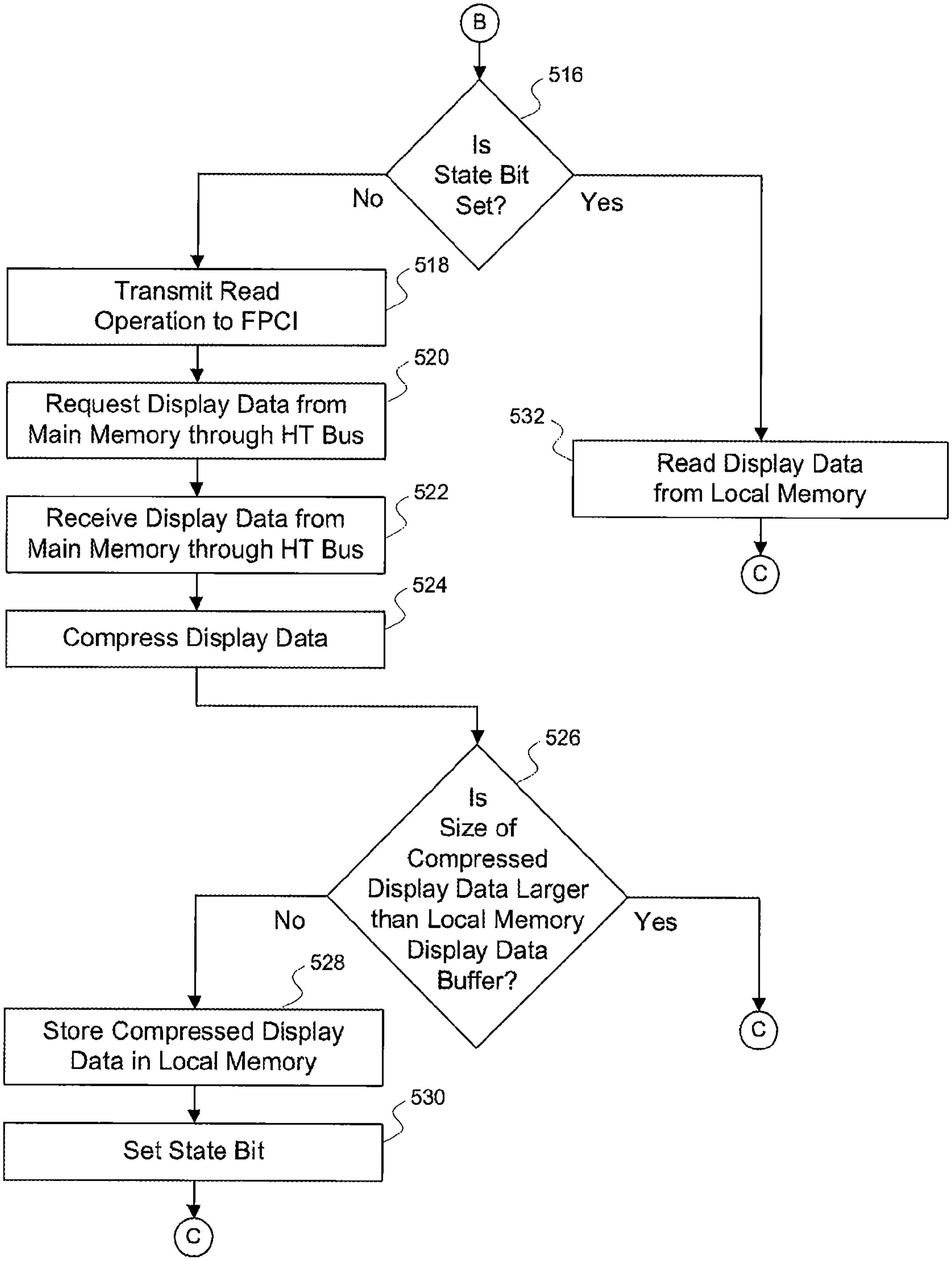
Figure 5C:
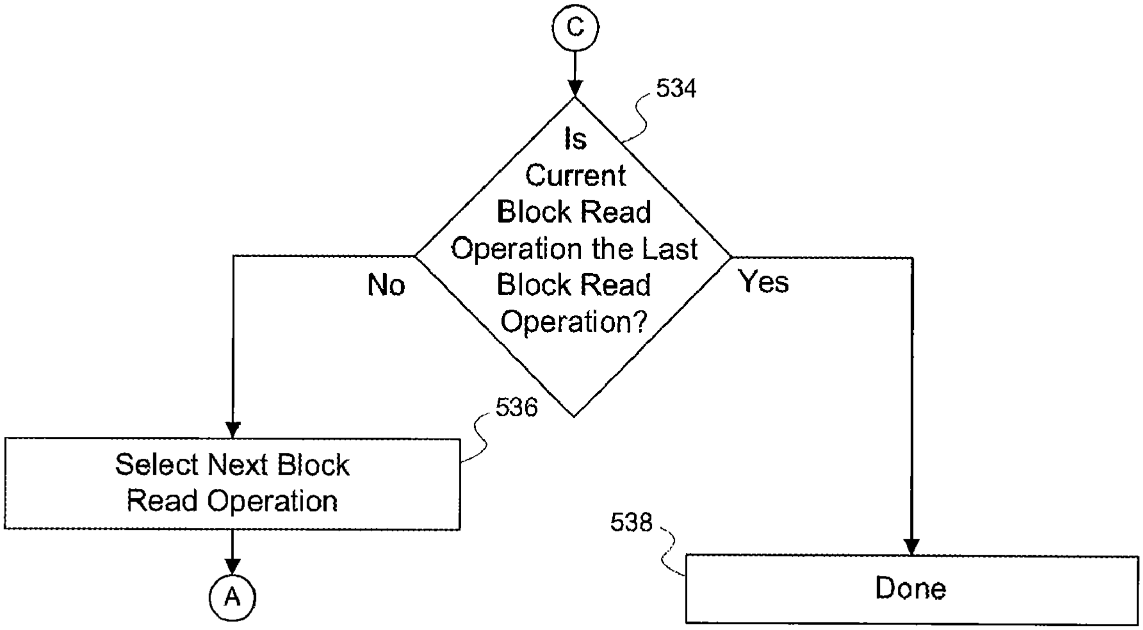

FIGS. 5A, 5B and 5C illustrate a flowchart of method steps for executing a smaller read operation on display data stored in local memory 220 and/or main memory, according to one embodiment of the invention. As previously indicated, this method sets forth the more specific steps reflected in step 414 of FIG. 4. Although the method is described in reference to the GPU 200 of FIG. 2, persons skilled in the art will understand that any system configured to perform the method steps, in any order, is within the scope of the present invention.

As shown, the method for executing a smaller read operation begins at step 502, where primary unrolling logic 210 transmits the smaller read operation to block unrolling logic 212 through interface 228. In step 504, block unrolling logic 212 partitions the smaller read operation, as needed, into block read operations, such that each resulting block read operation is limited to reading pixels located within a single display block. In step 506, block unrolling logic 212 selects a first block read operation from the series of block read operations to process as the current block read operation.

In step 508, block unrolling logic 212 transmits the current block read operation to tiling logic 214 through interface 232. In step 510, tiling logic 214 determines the physical address of the block read operation from the screen address of the display block associated with the block read operation. Importantly, the physical address of the block read operation corresponds to the starting address of a display data buffer in either the local memory 220 or main memory where display data for the display block associated with the block read command is stored. In step 512, control logic 207 determines which state bit in the state bit memory 218 corresponds to the display data buffer identified in step 510. In step 514, control logic 207 reads the state bit identified in step 512 and, in step 516, determines whether the state bit is set. If the state bit is not set, then the display data stored in the display data buffer in the local memory 220 identified in step 510 is either not present or is invalid. The method then proceeds to step 518, where tiling logic 214 transmits the block read operation to the FPCI 204, through the interface 250, in preparation for reading the display data from main memory. In step 520, the FPCI 204 requests the display data from main memory by transmitting the block read operation to the HT bus 108, and, in step 522, the FPCI 204 receives the display data requested in step 520.

In step 524, control logic 207 creates a compressed form of the display data without disturbing the uncompressed display data originally received by the FPCI 204. In step 526, control logic 207 determines whether the size of the compressed display data is greater than the capacity of the display data buffer in the local memory 220 identified in step 510. If the size of the compressed display data does not exceed the capacity of that display data buffer, then the method proceeds to step 528, where control logic 207 stores the compressed display data in the display data buffer in the local memory 220 identified in step 510. In step 530, control logic 207 sets the state bit in the state bit memory 218 corresponding to that display data buffer, and the method proceeds to step 534.

In step 534, block unrolling logic 212 determines whether the current block read operation is the last block read operation in the series of block read operations generated in step 504. If the current block read operation is not the last block read operation, then the method proceeds to step 536, where block unrolling logic 212 selects the next block read operation in the series of block read operations. The method then returns to step 508, where that next block read operation is transmitted to the tiling logic 214 for processing. If, in step 534, block unrolling logic 212 determines that the current block read operation is the last block read operation in the series of block read operations, then the smaller block read operation has been fully processed, and the method terminates in step 538.

Returning now to step 526, if the size of the compressed display data is greater than the capacity of the display data buffer in the local memory 220 identified in step 510, then the compressed display data cannot be stored in the local memory 220, and the method simply proceeds to step 534. Returning now to step 516, if the state bit read in step 514 is set, then the display data in the display data buffer in the local memory 220 identified in step 510 is present and valid. The method then proceeds to step 532, where control logic 207 reads the display data from that display data buffer into reorder logic 222 through the interface 244. The method then proceeds to step 534.

Figure 6A:
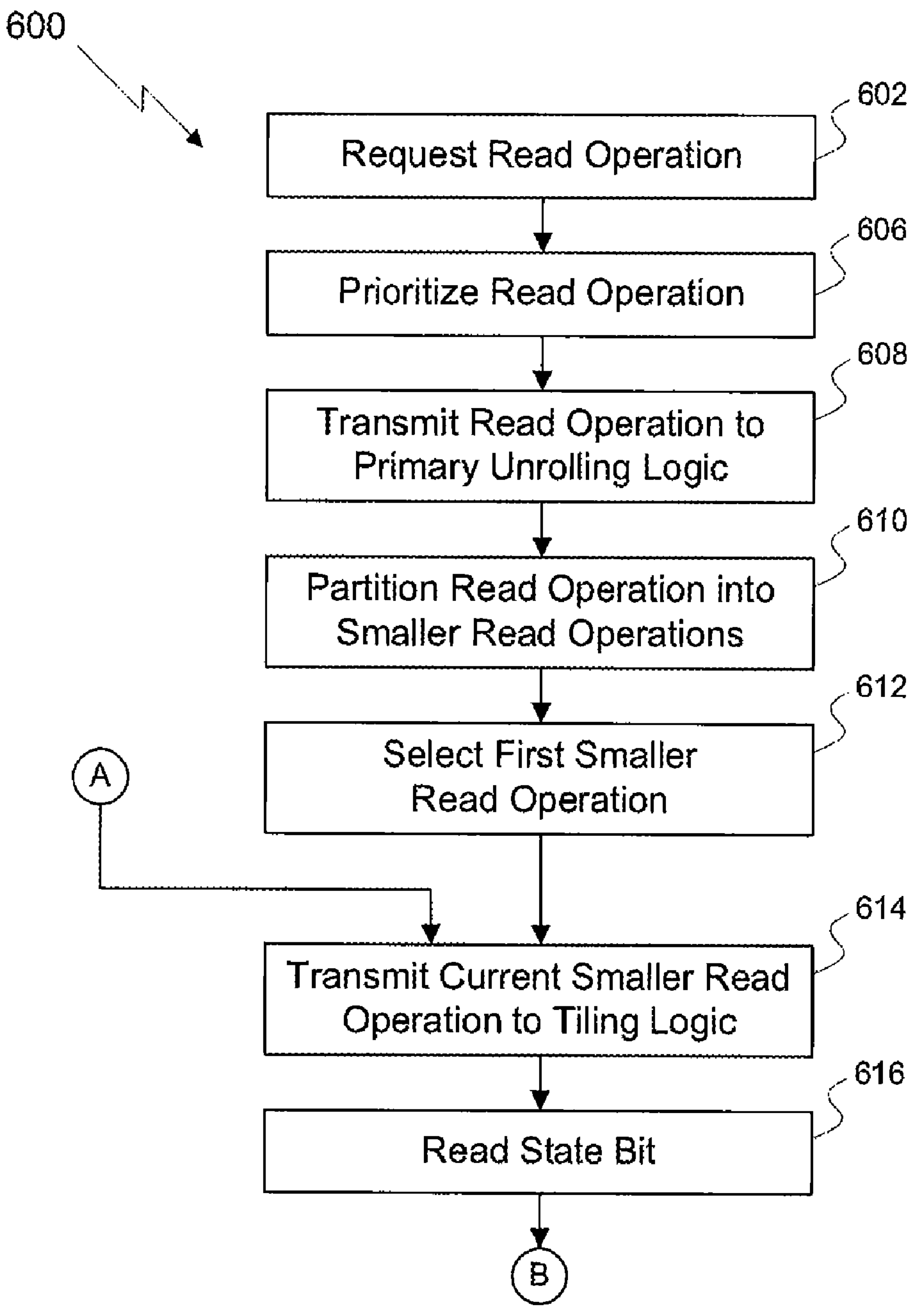
FIGS. 6A and 6B illustrate a flowchart of method steps for executing a read operation on cursor data stored in local memory and/or main memory, according to one embodiment of the invention.
Figure 6B:
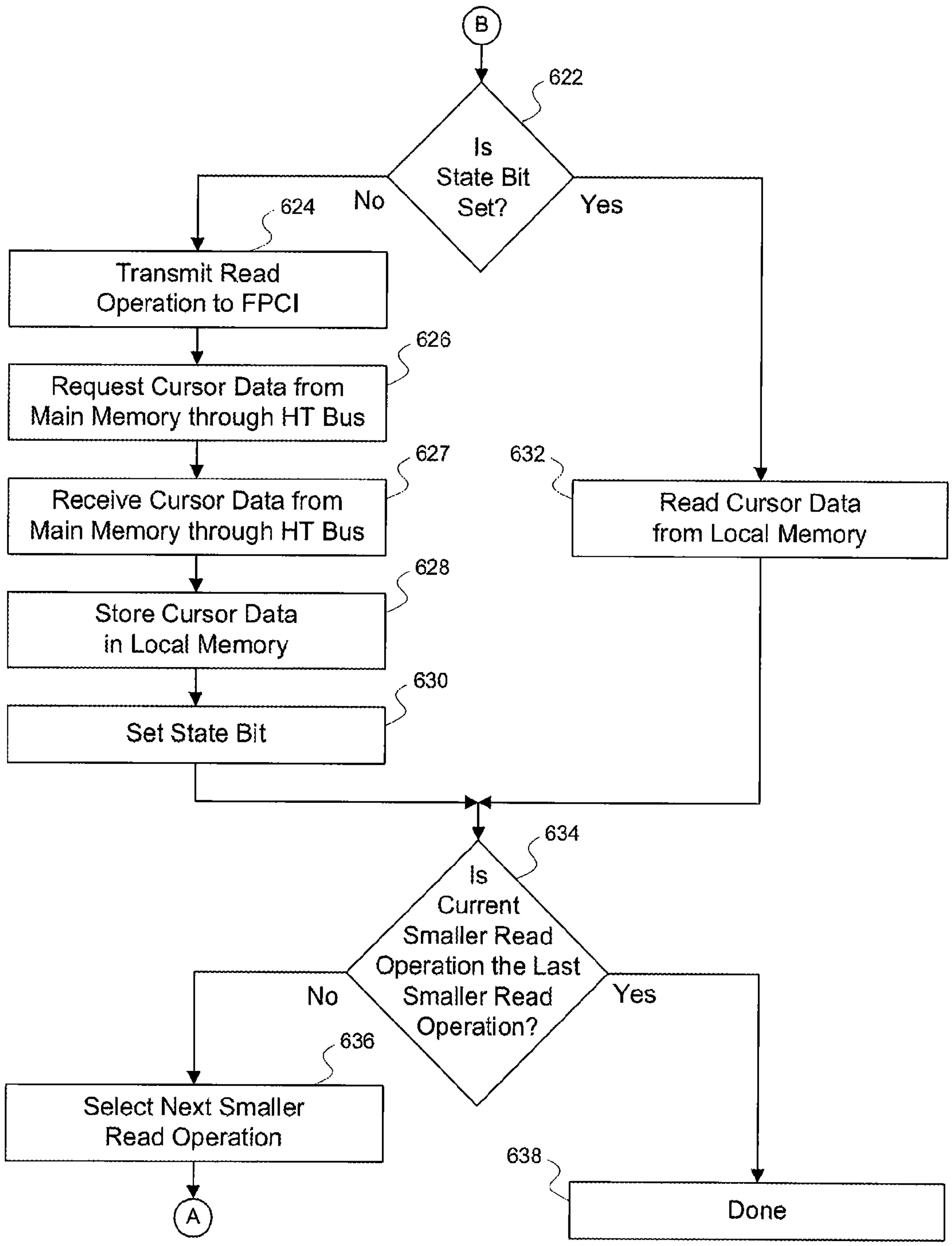

FIGS. 6A and 6B illustrate a flowchart of method steps for executing a read operation on cursor data stored in local memory 220 and/or main memory, according to one embodiment of the invention. As previously indicated, this method sets forth, more specifically, the steps for reading cursor data from local or main memory, as the case may be, in step 324 of FIG. 3. Although the method is described in reference to the GPU 200 of FIG. 2, persons skilled in the art will understand that any system configured to perform the method steps, in any order, is within the scope of the present invention.

As shown, the method for reading cursor data begins at a step 602, where display logic 206 requests through the interface 227 for arbitration logic 208 to read all cursor data from memory. Again, data requested may be stored in the local memory 220 or the main memory. Importantly, unlike display data, which, in one embodiment, is stored within a plurality of display data buffers in the local memory 220, cursor data is stored within a single cursor data buffer in the local memory 220. Thus, all of the cursor data in the cursor buffer 225 in the local memory 220 is either present or valid or that data is not present or invalid. In step 606, arbitration logic 208 prioritizes the read operation. As previously described, read operations related to a display update have a fixed time constraint, so arbitration logic 208 assigns a high priority to these read operations, while read or write operations for other purposes may be assigned a lower priority. In step 608, arbitration logic 208 initiates the high priority read operation by transmitting the read operation through the interface 234 to primary unrolling logic 210.

In step 610, primary unrolling logic 210 partitions the read operation into a series of smaller read operations that are small enough for the HT bus to perform as single bus transactions. After unrolling the read operation into smaller read operations in step 610, primary unrolling logic 210 selects a first smaller read operation to process as the current smaller read operation. In step 614, primary unrolling logic 210 transmits the current smaller read operation to tiling logic 214 through interface 230. Unlike display data block read operations, which have a screen-to-physical address translation step within tiling logic 214, cursor data smaller read operations do not need an address translation step because each cursor data read smaller operation is requested with a physical address. In step 616, control logic 207 reads the cursor state bit from the state bit memory 218 and, in step 622, determines if the cursor state bit is set. If the cursor state bit is not set, any cursor data stored in the cursor buffer 225 in the local memory 220 is either not present or invalid. The method then proceeds to step 624, where tiling logic 214 transmits the smaller read operation to the FPCI 204, through the interface 250, as a first step in reading from main memory. In step 626, the FPCI 204 requests the cursor data from main memory by transmitting the smaller read operation to the HT bus 108. In step 627, the FPCI 204 receives the cursor data requested in step 626. In step 628, control logic 207 stores the cursor data in the cursor buffer 225 in the local memory 220. In step 630, control logic 207 sets the cursor state bit, and the method proceeds to step 634.

In step 634, primary unrolling logic 210 determines whether the current smaller read operation is the last smaller read operation in the series of smaller operations generated in step 610. If the current smaller read operation is not the last smaller read operation, the method proceeds to step 636, where primary unrolling logic 210 selects the next smaller read operation in the series of smaller read operations. The method then returns to step 614, where that next smaller read operation is transmitted to the tiling logic 214 for processing. If, in step 634, the current smaller read operation is the last smaller read operation in the series of smaller read operations, then the method proceeds to step 638 and terminates.

Returning now to step 622, if the cursor state bit read in step 616 is set, then the cursor data in the cursor buffer 225 in the local memory 220 is present and valid. In step 632, control logic 207 reads the cursor data from the cursor buffer 225, and the method then proceeds to step 634.

Figure 7:
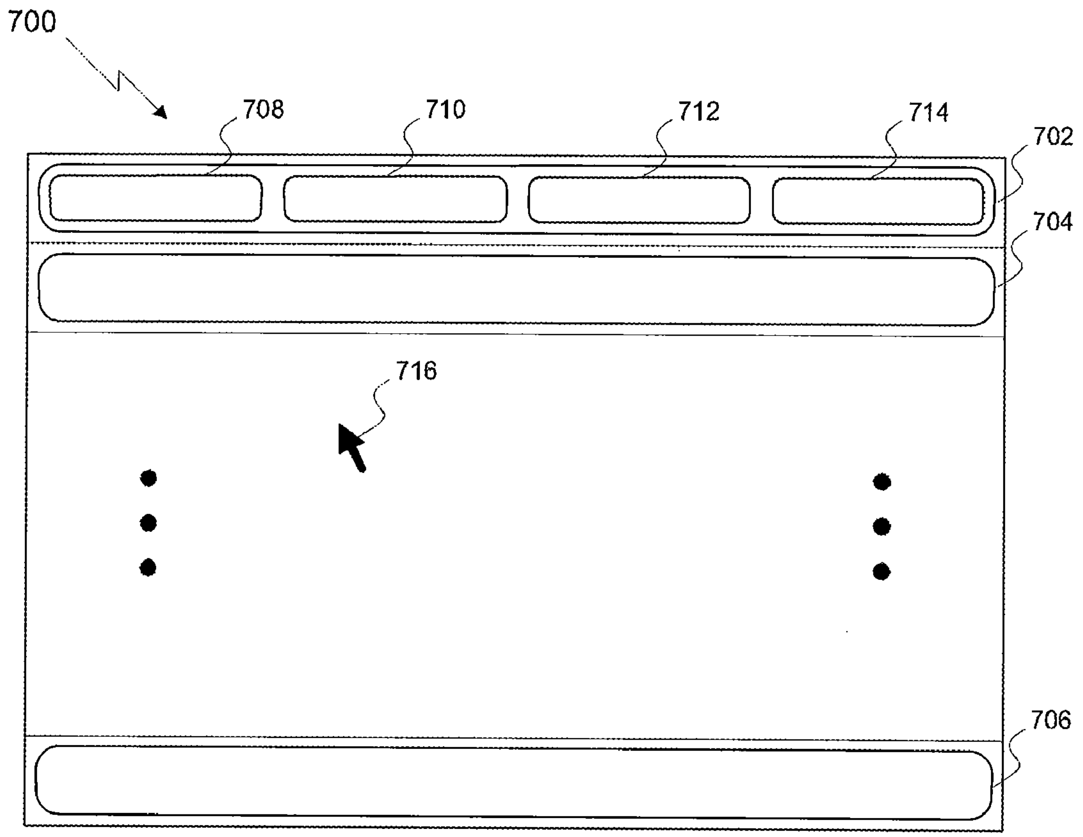
FIG. 7 illustrates a video display organized as lines of pixels, with each line broken into a plurality of blocks, according to one embodiment of the invention.

FIG. 7 illustrates a video display configured as lines of pixels, with each line broken into a plurality of blocks, according to one embodiment of the invention. As shown, the display 700 includes a plurality of display lines, 702, 704 and 706. Additionally, each display line includes a plurality of blocks, which include a plurality of pixels (not shown). The display line 702 includes display blocks 708, 710, 712 and 714. Other display lines and the blocks included within display lines 704 and 706 are not shown for the sake of simplicity. However, as previously discussed, other embodiments of the invention may include any technically feasible number of blocks per display line. In addition to display lines and blocks, the display 700 may also include a cursor 716. As previously described herein, the data related to cursor 716 may be stored in compressed or uncompressed form in the local memory to realize further efficiencies and power reduction relative to storing the cursor data in main memory.

Figure 8:
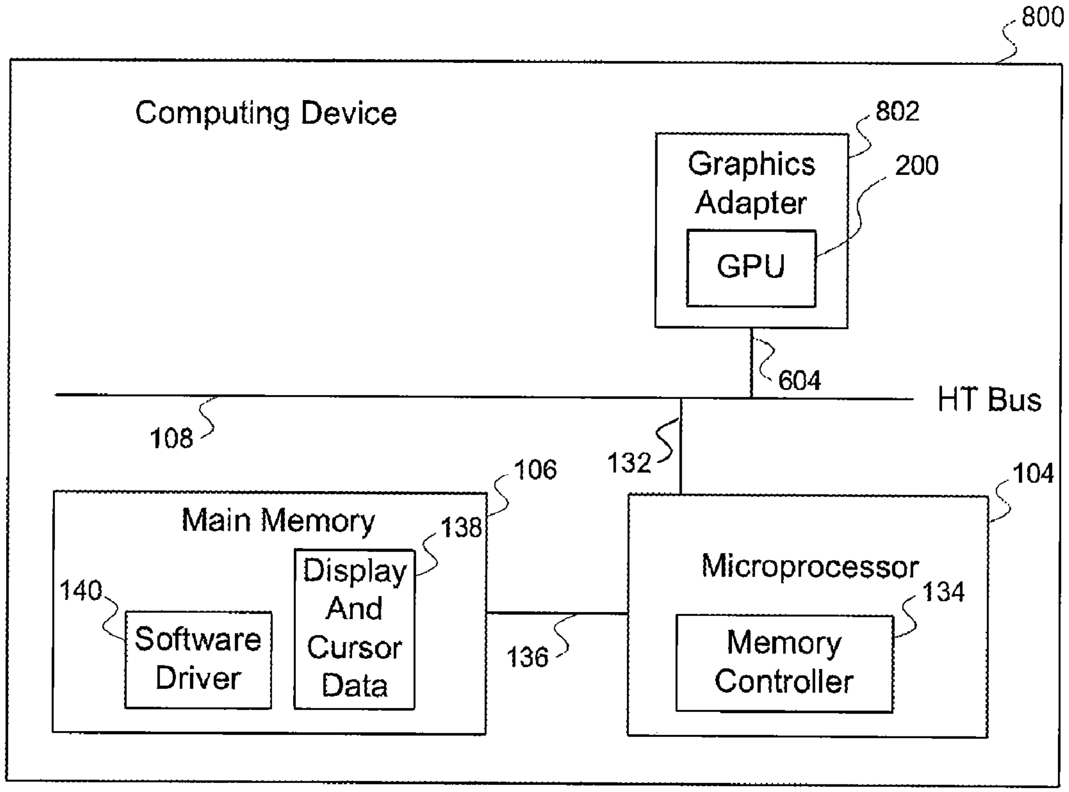
FIG. 8 illustrates a computing device in which one or more aspects of the invention may be implemented.

FIG. 8 illustrates a computing device 800 in which one or more aspects of the invention may be implemented. As shown, the computing device 800 includes the microprocessor 104, the main memory 106, a graphics adapter 802 and the HT bus 108. The graphics adapter 802 includes the GPU 200 of FIG. 2, the microprocessor 104 includes the memory controller 134, and the main memory 106 includes a software driver program 140 and display data 138. The graphics adapter 802 is coupled to the HT bus 108 through interface 252 and the microprocessor 104 is coupled to the HT bus 108 and the main memory 106 through interfaces 132 and 136, respectively. The computing device 800 may be a desktop computer, server, laptop computer, palm-sized computer, personal digital assistant, tablet computer, game console, cellular telephone, or any other type of similar device that processes information. In alternative embodiments, the memory controller 134 may reside outside of the microprocessor 104, and the GPU 200 may be integrated into a chipset or the microprossor 104 rather than existing as a separate and distinct entity, as depicted in FIG. 8.

In an alternative embodiment of the invention, referred to as "frame compression," the GPU 200 may be configured to store some or all of an entire frame as a single display block. This single display block is compressed and stored in a single display data buffer in the portion of the local memory 220 where the compressed display data 226 is stored. Cursor data is stored in the cursor buffer 225 within the local memory 220 as well. Thus, referring back to FIG. 2B, in this embodiment, there would be only one display data buffer within the local memory 220, and any change to the display data in main memory invalidates all display data stored in the single, compressed display data buffer within the local memory 220. Additionally, if frame compression cannot store the entire compressed and current frame in the local memory 220, the GPU 200 compresses and stores as much of the current frame in the local memory 220 as the local memory size allows, and the GPU 200 stores the remainder of the current frame in main memory. Frame compression uses a single display state bit per display line to indicate which lines of the display data are present and valid in local memory. Using one state bit per display line allows frame compression to determine which display lines are preferentially stored in the local memory 220. Overall, the frame compression embodiment may compress the display data more efficiently than block compression, potentially allowing more display data to be compressed and stored in the local memory 220, relative to the block compression embodiment. Since compressing and storing more display data in local memory can reduce power consumption and increase the mobile computing device's battery life, frame compression may be more advantageous than block compression in some applications. However, in other applications, frame compression may be less attractive than block compression, due to the nature and frequency of the display changes in those applications. For example, if portions of the display data change frequently (e.g., mobile computing devices with animated icons that change many times per second), the aforementioned frame compression advantages relative to block compression may be more than offset by rapid invalidation of the entire locally stored frame, causing all display data to be subsequently read from main memory. Thus, regardless of whether frame compression or block compression offers lower relative power consumption in a specific situation, one or both of these embodiments may substantially reduce the power consumed by a mobile computing device for many applications and users.

One advantage of the disclosed technique is that the power consumed by mobile computing devices may be substantially reduced by refreshing the screen using cursor data and display data stored in local memory. Another advantage of the disclosed technique is that the cost of implementing the local memory is lowered by compressing the display data before storing it in the local memory, relative to storing uncompressed display data.

While the foregoing is directed to embodiments of the present invention, other and further embodiments of the invention may be devised without departing from the basic scope thereof. The scope of the present invention is determined by the claims that follow.

We claim:

1. A method for configuring a graphics processing unit to refresh a screen display using data stored in a local memory or a main memory, the method comprising:

setting a threshold limit for a threshold counter to determine whether to store display data in the local memory;

generating frames of display data using display data stored in only the main memory when the threshold counter is less than the threshold limit;

incrementing the threshold counter upon a refresh of the screen display that does not result in data changes to the screen display;

generating a portion of a frame corresponding to one display block of a plurality of display blocks of the screen display using compressed display data stored in the local memory when the threshold limit has been reached and a state bit corresponding to the display block has been set, wherein the state bit is one state bit of a plurality of state bits, each state bit corresponding to a different one of the display blocks of the plurality of display blocks; and generating a second portion of the frame corresponding to a second display block of the screen display using display data stored in the main memory when the threshold limit has been reached and the state bit corresponding to the second display block has not been set.

2. The method of claim 1, further comprising the step of resetting the threshold counter upon a refresh of the screen display that results in data changes to the screen display.

3. The method of claim 1, further comprising the steps of:

compressing the display data for the second display block;

storing the compressed display data for the second display block in the local memory; and setting the state bit corresponding to the second display block.

4. The method of claim 3, further comprising the step of determining whether the compressed display data fits within the second display block, wherein the step of storing and the step of setting are performed only if the compressed display data fits within the second display block.

5. The method of claim 1, further comprising the steps of:

extracting a screen address from a read operation associated with the display block;

determining a physical address corresponding to the screen address;

accessing display data at the physical address in the main memory when the threshold counter is less than the threshold limit; and accessing compressed display data in the local memory when the threshold counter has reached the threshold limit and the state bit corresponding to the display block has been set.

6. The method of claim 5, further comprising the step of accessing display data in the main memory when the threshold counter has reached the threshold limit and the state bit corresponding to the display block has not been set.

7. The method of claim 6, further comprising the step of determining whether one or more global settings has changed.

8. The method of claim 7, wherein at least one global setting has changed, and further comprising the steps of resetting the threshold counter and clearing each of the plurality of state bits.

9. The method of claim 1, wherein display data includes cursor data.

10. A computing device configured to refresh a screen display using data stored in a local memory and a main memory, the system comprising:

a host processor coupled to the main memory; and a graphics adapter having a graphics processing unit and the local memory, wherein the graphics processing unit includes:

a means for setting a threshold limit for a threshold counter to determine whether to store display data in the local memory, a means for generating frames of display data using display data stored in only the main memory when the threshold counter is less than the threshold limit, a means for incrementing the threshold counter upon a refresh of the screen display that does not result in data changes to the screen display, a means for generating a portion of a frame corresponding to one display block of a plurality of display blocks of the screen display using compressed display data stored in the local memory when the threshold limit has been reached and a state bit corresponding to the display block has been set, wherein the state bit is one state bit of a plurality of state bits, each state bit corresponding to a different one of the display blocks of the plurality of display blocks, and a means for generating a second portion of the frame corresponding to a second display block of the screen display using display data stored in the main memory when the threshold limit has been reached and the state bit corresponding to the second display block has not been set.

11. The computing device of claim 10, wherein the graphics processing unit further includes a means for resetting the threshold counter upon a refresh of the screen display that results in data changes to the screen display.

12. The computing device of claim 10, wherein the graphics processing unit further includes:

a means for compressing the display data for the second display block;

a means for storing the compressed display data for the second display block in the local memory; and a means for setting the state bit corresponding to the second display block.

13. The computing device of claim 12, wherein the graphics processing unit further includes a means for determining whether the compressed display data fits within the second display block, wherein the step of storing and the step of setting are performed only if the compressed display data fits within the second display block.

14. The computing device of claim 10, wherein the graphics processing unit further includes:

a means for extracting a screen address from a read operation associated with the display block;

a means for determining a physical address corresponding to the screen address;

a means for accessing display data at the physical address in the main memory when the threshold counter is less than the threshold limit; and a means for accessing compressed display data in the local memory when the threshold counter has reached the threshold limit and the state bit corresponding to the display block has been set.

15. The computing device of claim 14, wherein the graphics processing unit further includes a means for accessing display data in the main memory when the threshold counter has reached the threshold limit and the state bit corresponding to the display block has not been set.

16. The computing device of claim 15, further comprising a means for determining whether one or more global settings has changed.

17. The computing device of claim 16, wherein at least one global setting has changed, and further comprising the steps of resetting the threshold counter and clearing each of the plurality of state bits.

18. The computing device of claim 10, display data includes cursor data.

* * * * *